United States Patent
Haley et al.

(10) Patent No.: US 7,979,537 B2
(45) Date of Patent: *Jul. 12, 2011

(54) SYSTEM AND METHOD FOR DETECTING STATUS CHANGES IN A NETWORK USING VIRTUAL COORDINATE MAPPING

(75) Inventors: Michael R. Haley, South Salem, NY (US); Sanghwan Lee, Tarrytown, NY (US); Prashant Pradhan, New Rochelle, NY (US); Debanjan Saha, Mohegan Lake, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 442 days.

This patent is subject to a terminal disclaimer.

(21) Appl. No.: 12/131,241

(22) Filed: Jun. 2, 2008

(65) Prior Publication Data
US 2008/0235373 A1    Sep. 25, 2008

Related U.S. Application Data

(63) Continuation of application No. 11/214,102, filed on Aug. 29, 2005, now Pat. No. 7,496,663.

(51) Int. Cl.
*G06F 15/173* (2006.01)
*G06F 15/177* (2006.01)

(52) U.S. Cl. ........................................ 709/224; 709/220
(58) Field of Classification Search ........... 709/220–224
See application file for complete search history.

(56) References Cited

OTHER PUBLICATIONS

T.S.E. Ng et al, "Predicting Internet Newoek Distance with Coordinates-Based Approaches", INFOCOM 2002. Twenty-First Annual Joint Conference of the IEEE Computer and Communications Societies. Proceedings, IEEE; 2002; 10 pages.
H. Lim et al, "Constructing Internet Coordinate System Based on Delay Measurement", IMC '03 Oct. 27-29, 2003; Miami Beach, FL; 14 pages.
F. Dabek et al, "Vivaldi: A Decentralized Network Coordinate System", SIGCOMM '04, Aug. 30-Sep. 3, 2004, Portland, OR, 12 pages.
L. Tang et al, "Virtual Landmarks for the Internet", IMC '03, Oct. 27-29, 2003; Miami Beach, FL; 10 pages.

*Primary Examiner* — Larry Donaghue
(74) *Attorney, Agent, or Firm* — Tutunjian & Bitetto, P.C.; Brian P. Verminkski, Esq.

(57) ABSTRACT

A system and method for scalable status change detection in a network of nodes includes embedding node coordinate positions into a virtual map environment. A cluster of nodes are represented with a representative node to form a hierarchy of nodes and clusters where changes in a status of the representative node imply a status change in the nodes of the cluster. By selectively monitoring the representative nodes for the changes in status, the representative nodes create a capability for scalable monitoring of the network.

31 Claims, 8 Drawing Sheets

SYSTEM AND METHOD FOR DETECTING STATUS CHANGES IN A NETWORK USING VIRTUAL COORDINATE MAPPING

RELATED APPLICATION INFORMATION

This application is a Continuation application of U.S. patent application Ser. No. 11/214,102 filed Aug. 29, 2005, Now U.S. Pat. No. 7,496,663, issued Feb. 4, 2009, incorporated herein by reference in its entirety.

BACKGROUND

1. Technical Field

The present invention relates to a scalable, hierarchical system and method for quickly detecting network anomalies or large changes in network delay using a scalable end-to-end approach.

2. Description of the Related Art

Users or network operators often intend to monitor the status of different parts of a network continuously to detect anomalies quickly. Current internet routing protocols link status monitoring and adjust the routing table to detour failed links. However, the routing change information of a remote network does not usually propagate to the other parts of the internet because of the BGP (border gateway protocol) policy routing. For some applications like overlay network or p2p (peer to peer) network, the number of nodes is very large and widely distributed. So it is quite difficult to quickly know the network status around remote nodes.

One straightforward way is to monitor the nodes of interest continuously. However, if the number of nodes of interest is high, the monitoring process is not scalable.

SUMMARY

Embodiments of the present invention include hierarchical methods using a virtual coordinate based map embedding process to make monitoring networks more scalable and to be able to address the dynamic nature of the network changes. A hierarchical approach is included which is directed towards determining the delay anomalies in the network by combining the hierarchical map embedding with detailed topology aware probing and to selectively diagnose for network delay anomalies via a virtual co-ordinate approach. Selective diagnosis of changes in attributes that describe the virtual coordinates is also included.

A system and method for scalable status change detection in a network of nodes includes embedding node coordinate positions into a virtual map environment. A cluster of nodes are represented with a representative node to form a hierarchy of nodes and clusters where changes in a status of the representative node imply a status change in the nodes of the cluster. By selectively monitoring the representative nodes for the changes in status, the representative nodes create a capability for scalable monitoring of the network.

A system/method for scalable status change detection in a network of nodes includes determining reference positions in a virtual map environment and determining node coordinate positions based on the reference positions in the virtual map environment. Clustering of nodes based on the positions in the virtual map environment is performed. A cluster of nodes is represented with a leader node where changes in a status of the leader node implies a status change in the nodes of the cluster. The leader node is monitored for status changes.

Another system/method for scalable status change detection in a network of nodes includes embedding node coordinate positions into a virtual map environment, and representing a cluster of nodes with a representative virtual map to form a hierarchy of virtual maps representing clusters and subclusters of nodes such that changes in a status of the representative virtual map implies a status change in the nodes of the cluster or subcluster. The representative virtual maps are selectively monitored for the changes in status such that the representative virtual maps create a capability for scalable monitoring of the network.

A system for monitoring status changes in a network includes a server coupled to a network and interacting with the network to collect virtual coordinate information from the network. A virtual map is stored in memory associated with the server. The virtual map includes virtual coordinates for nodes and representative nodes, which represent groups of nodes in the network. A monitoring module periodically updates the virtual coordinates in the map to detect status changes in or between the nodes or groups of nodes. The virtual coordinates represent monitored properties of the network.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
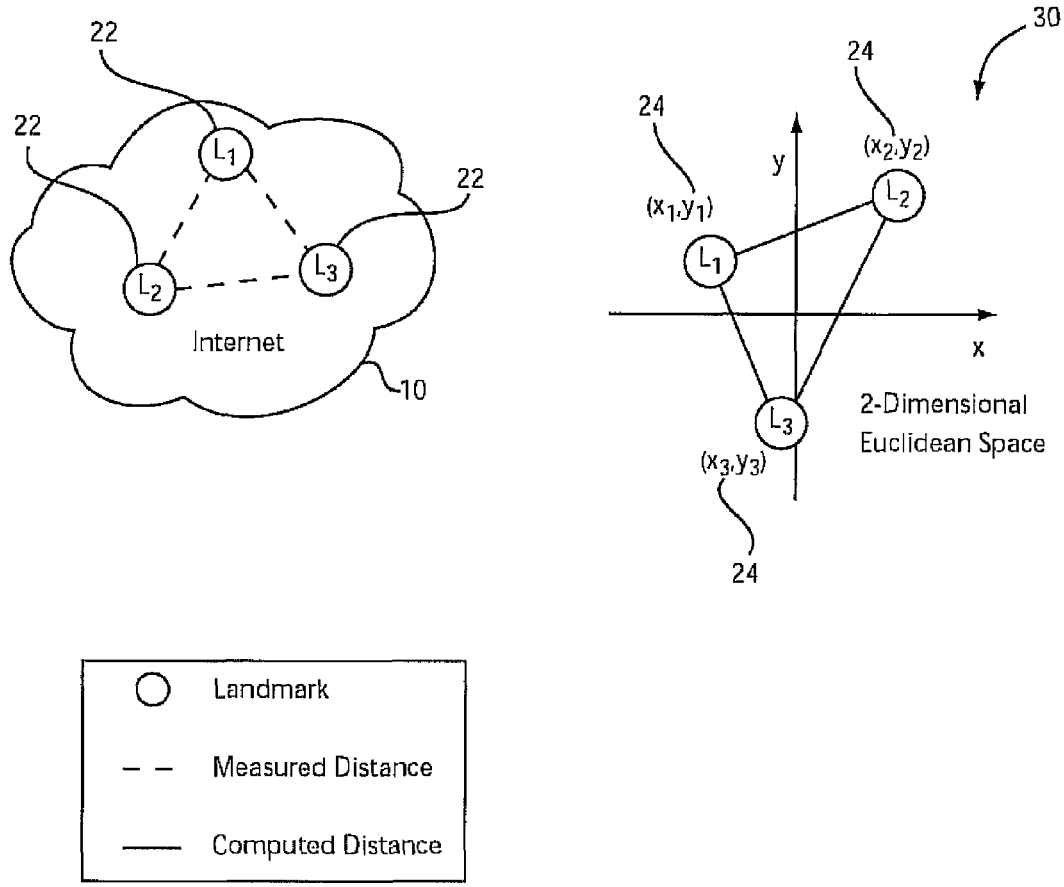
FIG. 1 is a diagram showing landmarks positions assigned to a virtual map.

Exemplary embodiments of the present invention provide a scalable adaptive network monitoring system and method. Target nodes are grouped into a number of clusters. The nodes in a cluster are preferably in a close area. In other words, the network status change of a node implies the network status change of other nodes. However, it is quite difficult to find out which nodes are close to which.

A virtual coordinate system is employed where a set of ping points, landmarks or other reference positions are chosen in the Internet or other network. Distances from the references to the target nodes are measured. Based on the network distances from the references to the target nodes, a set of virtual coordinates are computed in 2 or 3 dimensional Euclidean space for each target node in such a way that the network distance is estimated by a geometric distance in the Euclidean space. Since the virtual coordinate system provides a method to estimate the distance among hosts, clustering algorithms may be applied, such as K-mean, to group the target nodes. Next, a node is selected from each cluster, and only the selected nodes are monitored. The monitoring includes the landmarks periodically measuring the distances from themselves to the selected nodes. Then, new virtual coordinates for the selected nodes are computed.

If the position of the selected nodes changes more than a threshold, it is likely that the network status around the node may have also changed. The group that the node belongs to is further investigated. However, all nodes in the group need not be monitored. The group may be subdivided into several subgroups by applying some clustering algorithms and then choosing a centroid or representative node for each subgroup. The network status of the centroids may be obtained again. If some of the centroids have changed their positions, the subgroups may be further subdivided.

The nodes with a network status change can be identified. This set of nodes may be referred to as identified nodes. However, the problem area of the network may not actually be known. To get more detailed information, traceroute data may be used, assuming that the traceroute data from the landmarks to all the target nodes is available.

A set of segments involved in the traceroute data is collected. A segment is a consecutive set of links at which no branch is attached. Then, for each segment, the following steps may be iterated.

Choose one segment, and if the segment has increased its delay, list all the target nodes that would be affected by the delay increase of the segment. If the set of selected target nodes are a subset of the identified nodes, the segment is a possible candidate which causes the network status change. If the set is a superset of the identified nodes, the segment cannot be a problematic node. This iteration sequence may be performed for other segments.

The set of segments selected in the above steps includes the candidates which might have caused the problem. Among the selected set of segments, the smallest subset of segments is chosen. This smallest subset of the segments is assumed to have caused the network changes of the identified nodes. One heuristic in this algorithm is that the cause of network changes should be as small as possible. To find out the set, a straightforward exponential time algorithm may be used, e.g., just try each subset of the selected segments to see whether that subset causes the network status change of the identified nodes.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a scalable network distance map service is illustratively shown in accordance with an embodiment of the present invention. A network 10 may include the Internet, a cable network, a telephone network, a local area network, a wide are network or any other distributed network. Network 10 includes a plurality of nodes 20. Among these nodes 20, landmarks or points of measurement 22 may be defined.

Each node 20 is assigned a set of coordinates 24 that represents its positioning in a virtual map 30. The coordinates (e.g., (x, y) coordinates) reflect one or more properties (e.g., delay, distance, traffic congestion, packet loss rate, activity, security, etc.) relative to other nodes in the map 30. For example, x, y may be position; x may be delay and y, a measure of traffic, etc. The assigned coordinates 24 are determined in such a manner that the relative ordering of the desired property remains valid. For example, a round trip time (RTT) metric among a set of nodes can be considered. Each node 22 is assigned a coordinate in Euclidean space in the virtual map 30 such that the Euclidean distance between the two coordinates provides the RTT between the two corresponding nodes. This process may be defined as a "map embedding" process. The present invention makes use of a map embedding process to scalably determine, e.g., delay changes, distances or other properties between nodes in a network.

There may be any number of landmarks or other reference positions 22; however three well distributed landmarks may give preferred results. The landmarks 22 are employed to provide a reference against which other nodes may define their coordinates in a virtual coordinate map.

Figure 2:
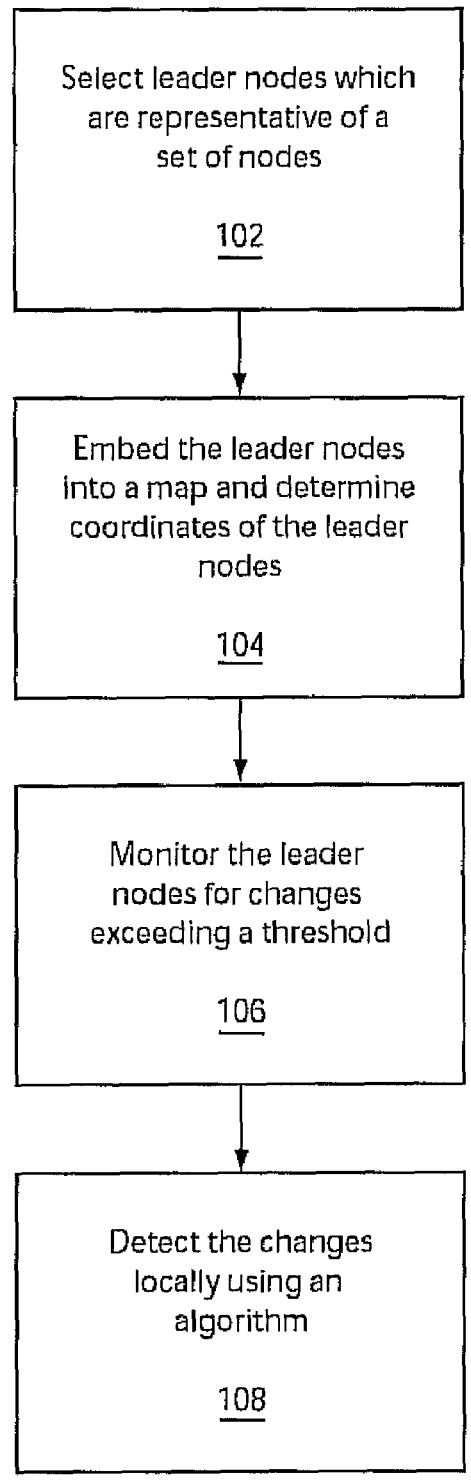
FIG. 2 is a block/flow diagram showing a method for monitoring network changes in accordance with one embodiment.

Referring to FIG. 2, a map embedding process is shown in accordance with a general embodiment of the present invention. In block 102, among a large set of N nodes, only a few nodes M (where M<<N) are selected as leader nodes. This set of M nodes includes cluster leaders which are used for the map embedding process. A single node may also be selected if needed. In a multi-resolution approach, multi-level clusters or groups of nodes may be created. Only representative or leader nodes (or virtual maps thereof) need be monitored for each hierarchy of nodes.

In block 104, with a period interval, these M nodes are embedded into the map to determine the co-ordinates of these nodes.

If there is a change in the co-ordinate (beyond a specified threshold), the nodes are marked candidate nodes for detection for the co-ordinates which have changed in block 106. Now, a more detailed process (using traceroute or other software algorithms) is used to detect where the network delay has changed among this set of nodes in block 108.

Figure 3:
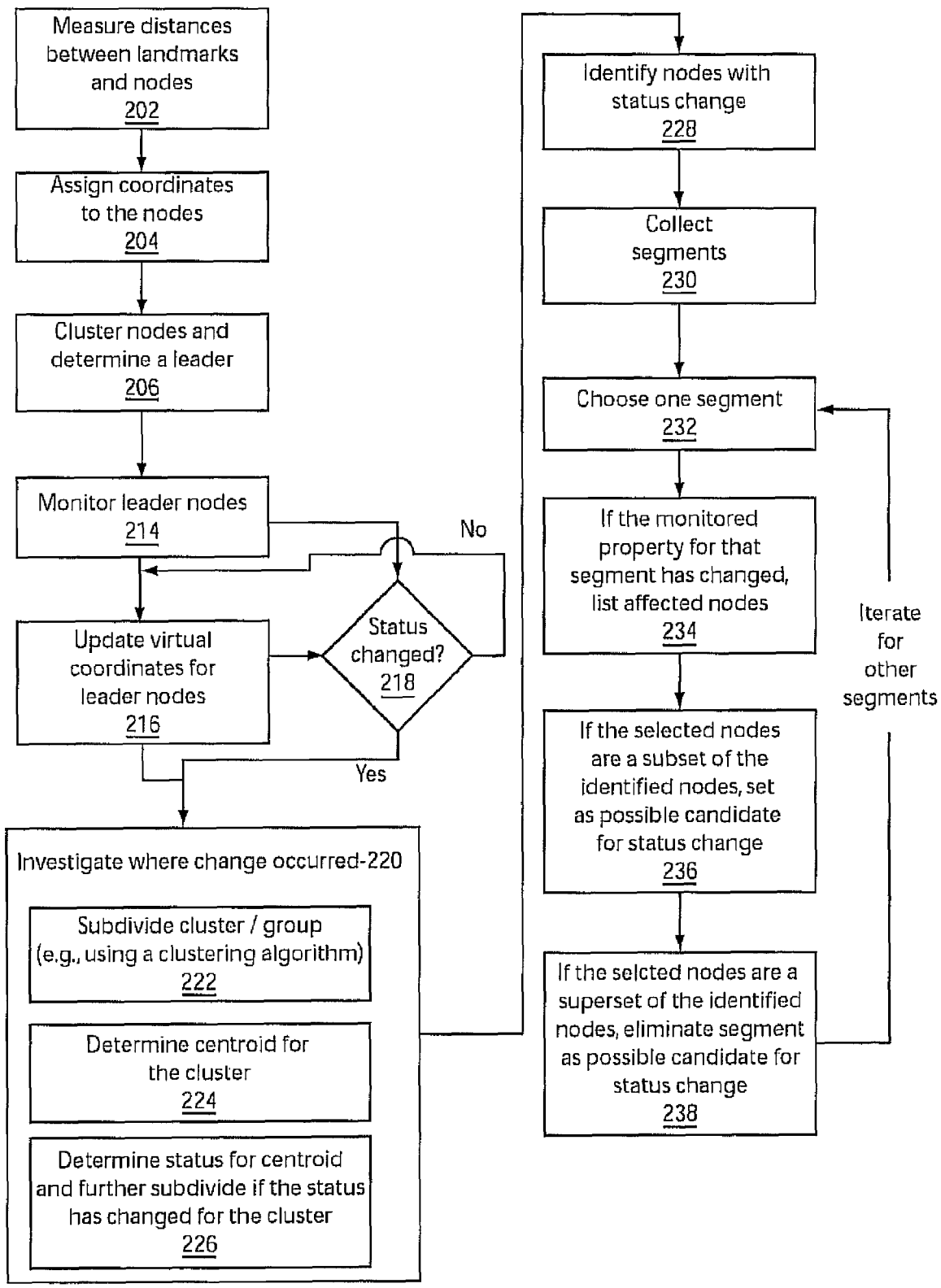
FIG. 3 is a block/flow diagram showing a method for monitoring network changes in accordance with a more detailed embodiment.
Figure 4:
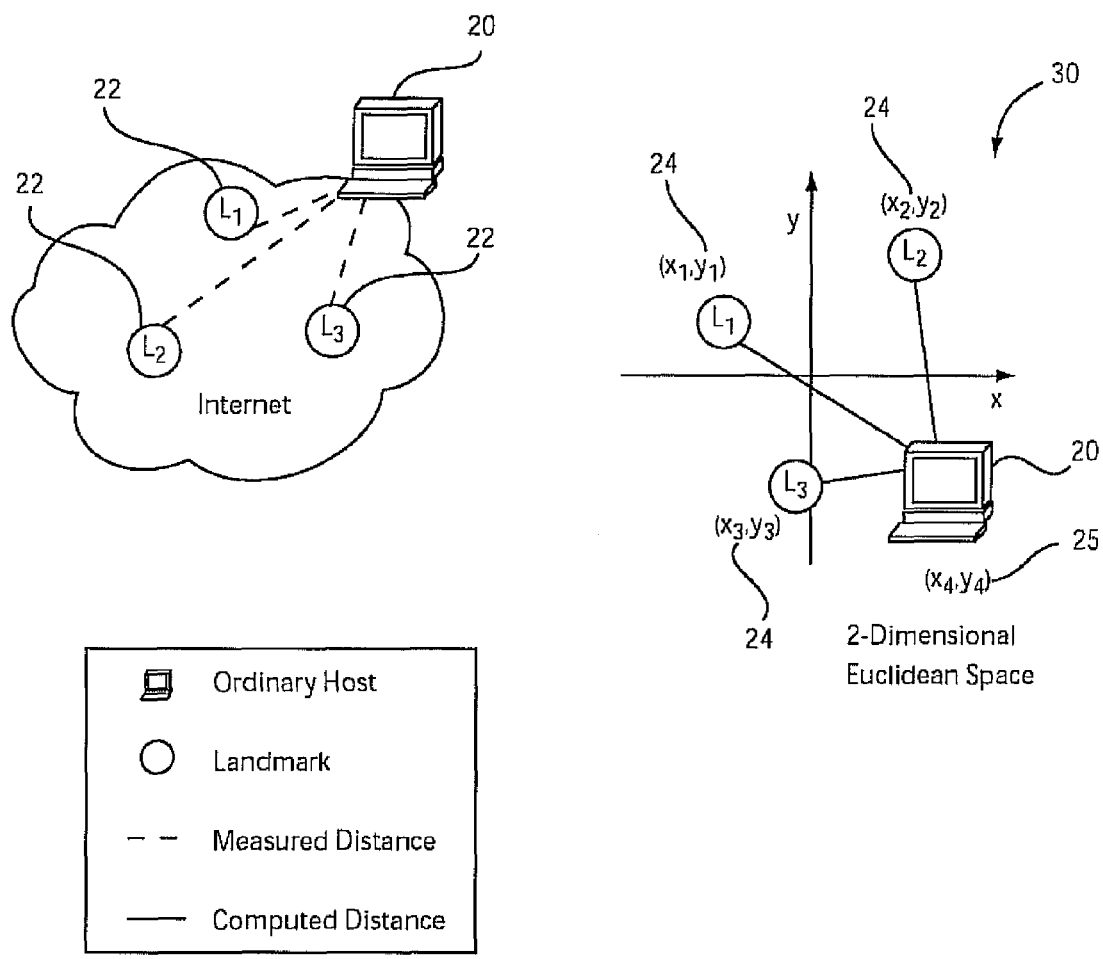
FIG. 4 is a diagram showing node or host positions determined relative to landmark positions in a virtual map.

Referring to FIGS. 3 and 4, the map embedding process using landmark nodes is illustratively shown in greater detail. After the landmarks nodes have been selected, added to the virtual map and coordinates determined for the landmark nodes, e.g., $L_1$, $L_2$, $L_3$ (as described with reference to FIGS. 1 and 2), each node or host node 20 is measured from a set of landmark nodes 22, e.g., for RTT in block 202. FIG. 4 shows a node or host node 20 calculating distances between the coordinates 24 for landmarks 22 in the virtual map 30. Once the RTT from these landmarks 22 is determined, a co-ordinate (x,y) 25 is assigned for the node 20 such that Euclidean distance preserves the metric of interest in block 204. In block 206, a clustering algorithm may be employed to determine which nodes to cluster together and define a leader node 33 for each cluster 35 (see FIG. 5).

Figure 5:
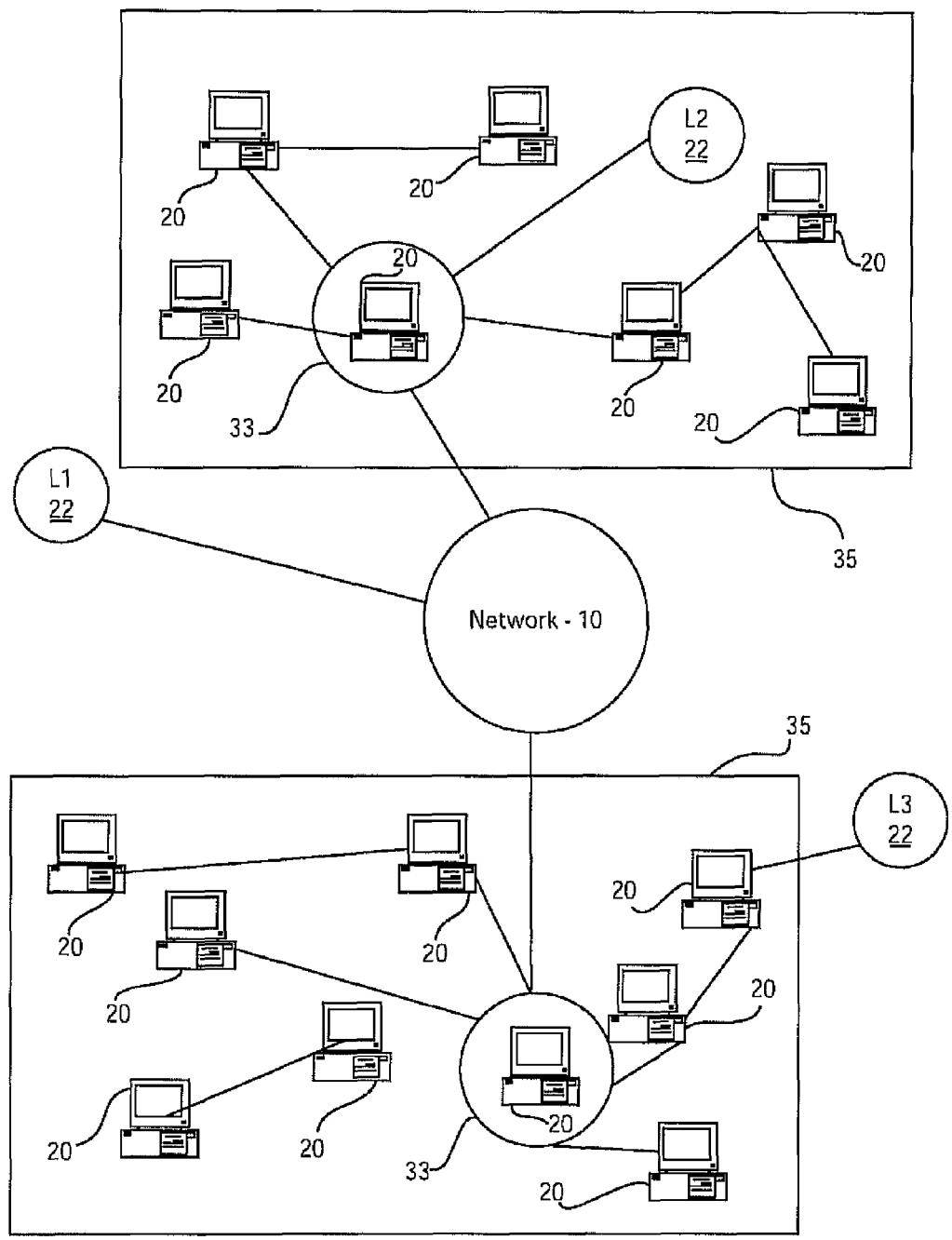
FIG. 5 is a diagram showing representative or leader nodes selected for a group of nodes in accordance with an aspect of the present invention.

Referring to FIG. 5, nodes 20 may be grouped into a cluster 35 of nodes. A clustering algorithm may be employed to determine which nodes to cluster together. The nodes 20 in a cluster 35 are preferably "close" to each other in an area. In other words, the network status change of a node implies the network status change of other nodes. While it is difficult to determine which nodes are "close" to each other, a virtual coordinate system 30 (FIG. 4) is employed where a set of ping points (landmarks 22) are chosen in the network 10. The distances from the landmarks 22 to the target nodes 20 which have been determined may be used to group the nodes into clusters 35, although other criteria may be employed. Each cluster 35 will have its own leader node 33 defined which is representative of the nodes of the cluster 35.

Referring again to FIG. 3, in block 206, in one embodiment, based on the network distances from the landmarks 22 to the target nodes 20, a set of virtual coordinates in 2 (or 3)-dimensional Euclidean space are computed for each target node in such a way that the network distance is estimated by the geometric distance in the Euclidean space. Since the virtual coordinate system provides a method to estimate the distance among hosts (20), clustering algorithms such as K-mean may be applied to group the target nodes.

A node from each cluster is selected and monitored (e.g., leader node 33) in block 214. In one embodiment, only the selected nodes are monitored. The monitoring provides that the landmarks periodically measure the distances from themselves to the selected nodes. Then, new virtual coordinates for the selected nodes are computed in block 21G.

In block 218, the new virtual coordinates are compared with the old virtual coordinates and if the position of the selected nodes changes more than a threshold, it is likely that the network status around the node has also changed. In block 220, the group where the change exceeding the threshold has occurred is further investigated to determine where the change has occurred since the system may not monitor all the nodes in the group.

In block 222, the group is subdivided into several subgroups by applying one or more clustering algorithms. In block 224, a centroid is chosen or calculated for each subgroup, and a network status is checked again for the centroids (block 208). If some of the centroids have changed their positions, the subgroups are further subdivided in block 226.

Figure 6:
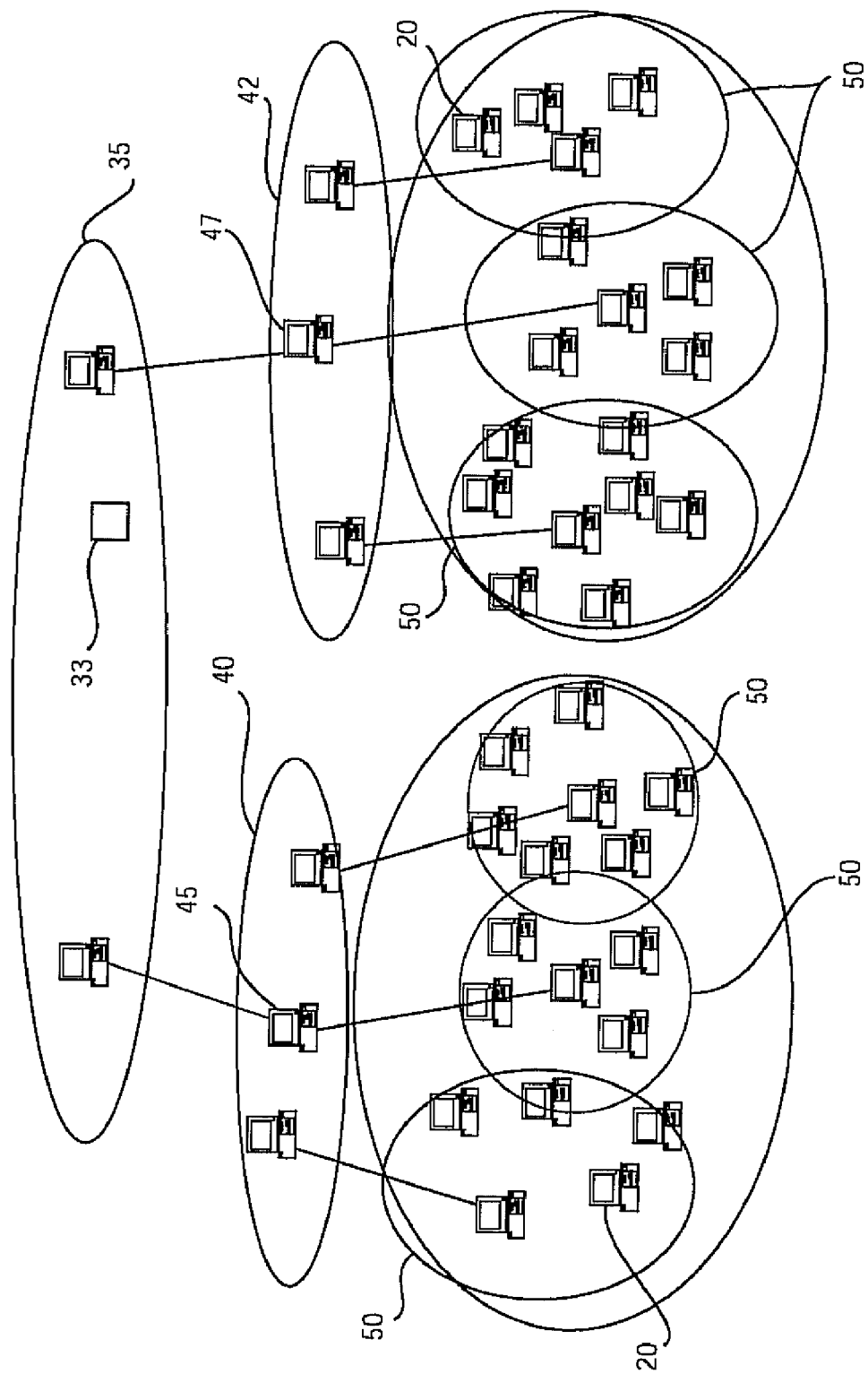
FIG. 6 is a diagram showing clusters of nodes subdivided to determine a location where an anomaly may have occurred.

Referring to FIG. 6, a leader node (or virtual map) 33 is monitored until a change exceeding a threshold is encountered. If such a problem exists, the clustering program subdivides the cluster (or virtual map of the cluster) 35 into subclusters (or virtual maps of the subcluster) 40 and 42. A centroid 45 and 47 is determined for each sub-cluster 40 and 42 and the monitoring is performed to further identify which sub-cluster has encountered the change. Each sub-cluster 40 and 42 can then be further subdivided into sub-sub-clusters 50 and so on until the status change has been identified.

By providing the clustering and declustering of nodes, a hierarchical system for monitoring the network is provided that is completely scalable to any size network or any number of nodes. The system can be monitored at a high level if everything is running well, or monitored at a very low level in trouble spots or any combination of granularity.

It is also to be understood that virtual maps may be arranged in a same hierarchical manner as nodes. In this way, a virtual map of a cluster can be monitored, and should a change occur, the problem can be zoomed in on by going down the hierarchy of virtual maps until the problems can be identified and solved. Virtual maps can be substituted for nodes as described herein for monitoring a network.

In one embodiment, scalable status change detection in a network of nodes may be preformed using the virtual maps arranged hierarchically. Node coordinate positions are embedded into a virtual map environment. A cluster of nodes may be represented by a representative virtual map to form a hierarchy of virtual maps representing clusters and subclusters of nodes such that changes in a status of the representative virtual map implies a status change in the nodes of the cluster or subcluster. The representative virtual maps are selectively monitoring for changes in status, and the representative virtual maps create a capability for scalable monitoring of the network.

Referring again to FIG. 3, the nodes with a network status change can be identified in block 228. This set of nodes may be called identified nodes. However, the areas which are actually the problematic part network are not specifically known. To get more detailed information, traceroute data or other date may be used, assuming that traceroute data from the landmarks to all the target nodes is available. In block 230, a set of segments involved in the traceroute data is collected. A segment is a consecutive set of links at which no branch is attached. Then, for each segment, the following steps are performed and iterated in a detection algorithm.

In block 232, choose one segment. In block 234, if the segment has changed its delay or other monitored property has changed, list all the target nodes that would be affected by the delay increase of the segment. In block 236, if the set of selected target nodes is a subset of the identified nodes, the segment is a possible candidate which causes the network status change. In block 238, if the set is a superset of the identified nodes, the segment cannot be a problematic node. Perform iterations for other segments.

The set of segments selected includes candidates which might have caused the problem. Among the selected set of segments, the smallest subset of segments is preferably chosen. This smallest subset of the segments may be concluded to have caused the network changes of the identified nodes. One heuristic in this algorithm includes that the cause of network changes should be as small as possible. To find out the set, a straightforward exponential time algorithm may be used, e.g., just try each subset of the selected segments to see whether that subset causes the network status change of the identified nodes.

Figure 7:
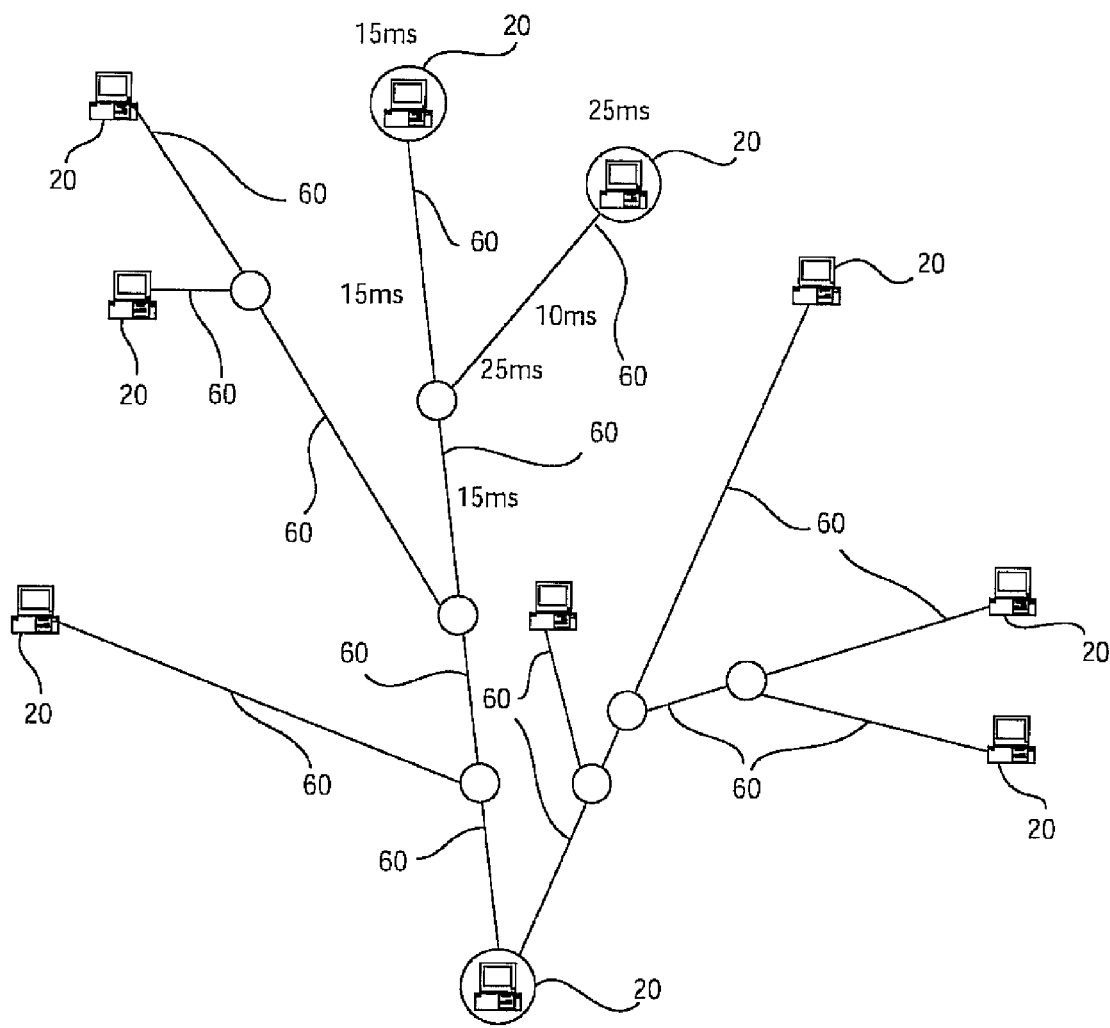
FIG. 7 is a diagram showing segments locations for determining where an anomaly may have occurred.

Referring to FIG. 7, a segment map showing segments 60 between nodes 20 is illustratively shown. Each segment 60 may have a time or other property calculated or measured for a particular segment. These properties can be compared using the segments analysis described above.

Segments or nodes can be characterized in advance. One possible approach would be to setup the nodes in a controlled environment or model and observe reported results and probe traffic as the various delays are injected. The output may be analyzed by correlating the delay changes with the injected probe traffic the tool in accordance with the present invention.

Figure 8:
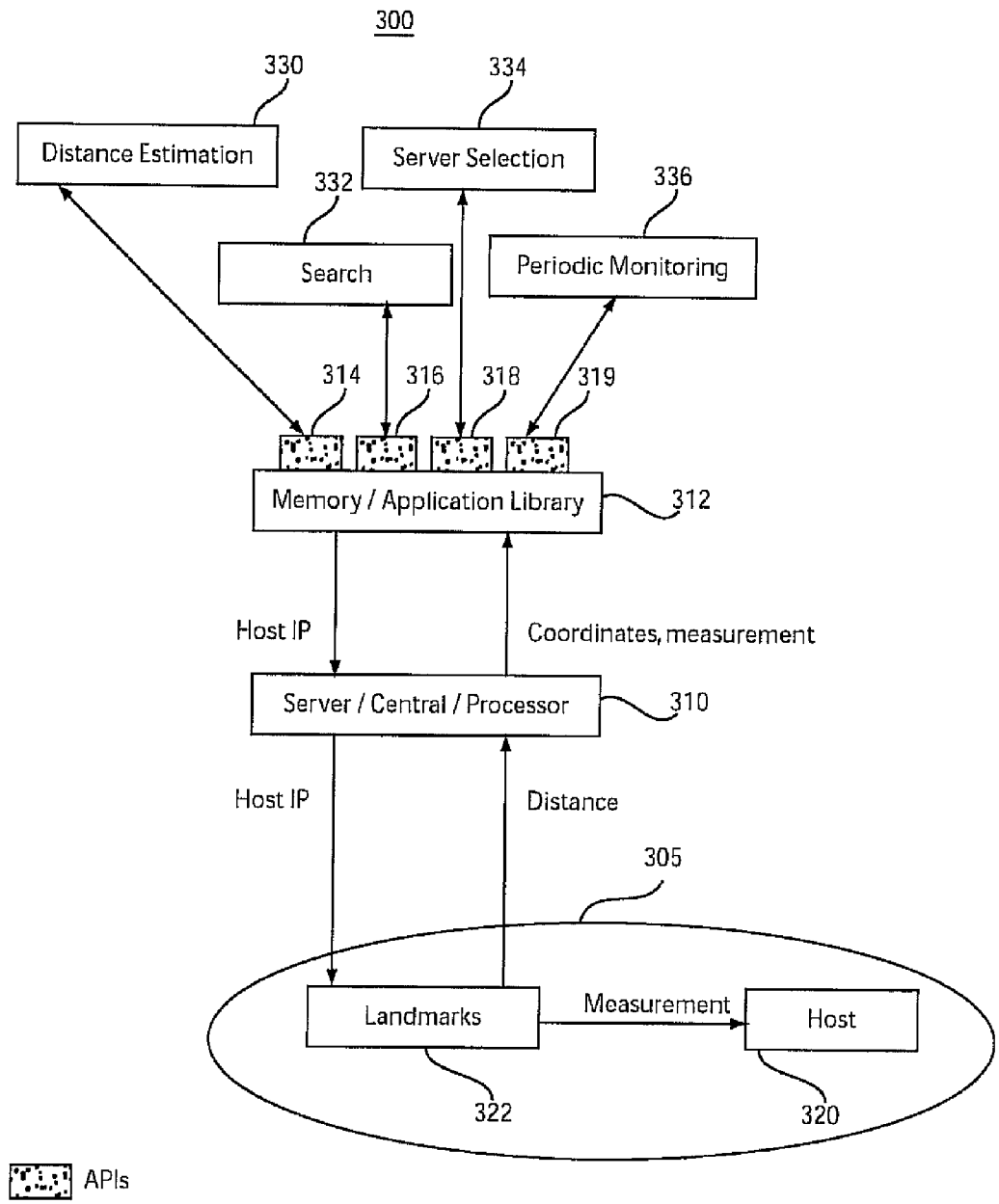
FIG. 8 is a block diagram showing a system for monitoring a network in accordance with an illustrative embodiment of the present invention.

Referring to FIG. 8, a system 300 for mapping and monitoring a network is illustratively shown in accordance with one embodiment of the present invention. A server 310 is connected to a network 305. The network 305 includes landmarks 322, which may include nodes or other identifying markers in the network 305. Landmarks 322 provide measurement information to host nodes or nodes 320. Other references may also be employed in addition to or instead of landmarks 322. Nodes 320 may include a leader node(s), cluster of nodes and/or a single node depending on the level of the hierarchy or the way the system has been set up. The landmarks 322 provide a reference from which virtual coordinates of the nodes 320 are determined.

Distance or other information is input to server 310, which processes this information to assign coordinates to the nodes 320. This information is stored in a database or library 312 to create a virtual map environment used to classify and associate (cluster) host nodes 320. Library 312 also stores modules for performing a plurality of services used in monitoring the network. For example, a distance estimation module 330, a search module 332, a server selection module 334 and a periodic monitoring module 336 are illustratively shown, along with their respective application programming interface 314, 316, 318 and 319, respectively. Other modules may be added and provided in stead or in addition to the modules illustratively shown.

Distance estimation module 330 performs distance calculations based on the virtual coordinates of the nodes of the network. Search module 332 enables the searching of the network for specific nodes, hardware, performance information or other criteria. Search module 332 permits the system to find nodes or segments which have underwent specific changes or changes of a specific value. Server selection module 334 permits the determination of leader nodes or centroids to provide a characteristic node/server to monitor rather than monitor all of the nodes of the network. Periodic monitoring module 336 looks for status changes between old and new virtual coordinates. These updates in status are tested periodically and compared to a threshold to determine if a problem exists. Other modules may be added or substituted for those shown in FIG. 8. The monitoring modules send requests for information or measurements to specific host nodes 320 (Host IP) and the nodes response with information, which is received and updated in the virtual map.

The present systems and methods may be provided as a monitoring service for a network. The hierarchical (levels of clustering) permit the system to easily be scaled to large and small networks regardless of the number of nodes. The service may be provided by purchasing a program storage device which runs the methods of the present invention.

Having described preferred embodiments of a system and method for detecting status changes using virtual coordinate mapping (which are intended to be illustrative and not limiting), it is noted that modifications and variations can be made by persons skilled in the art in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for scalable status change detection in a network of nodes, comprising the steps of:
   embedding node coordinate positions into a virtual map environment;
   representing a cluster of nodes with a representative node to form a hierarchy of nodes and clusters where changes in a status of the representative node implies a status change in the nodes of the cluster; and
   selectively monitoring the representative nodes for the changes in status such that the representative nodes create a capability for scalable monitoring of the network.

2. The method as recited in claim 1, wherein the hierarchy of nodes and clusters includes a multi-tiered structure of groups of nodes.

3. The method as recited in claim 1, wherein the step of selectively monitoring includes monitoring leader nodes at a plurality of different cluster levels to provide scalable monitoring of the network.

4. The method as recited in claim 1, further comprising the step of updating virtual coordinates in the virtual coordinate map to determine a change in status of nodes in the network.

5. The method as recited in claim 4, further comprising the step of investigating where changes have occurred by subdividing clusters or groups of nodes.

6. The method as recited in claim 5, further comprising the step of determining a centroid for the subdivided cluster and further subdividing the cluster if a status of the cluster has changed.

7. The method as recited in claim 1, wherein the step of selectively monitoring includes determining identified nodes which have changed status.

8. The method as recited in claim 7, wherein the step of determining nodes which have changed status includes, if a monitored property for a segment connecting nodes has changed, listing affected nodes.

9. The method as recited in claim 8, further comprising the step of comparing the affected nodes with the nodes that have changed status to determine candidates responsible for the status change.

10. The method as recited in claim 1, wherein the changes in the status being monitored include delay changes, distance changes, security, packet loss rate and/or activity changes.

11. The method as recited in claim 1, wherein the step of embedding coordinate positions includes computing distances in the virtual map environment.

12. A computer program product comprising a computer readable storage medium having a computer readable program, wherein the computer readable program when executed on a computer causes the computer to execute the steps of:
   embedding node coordinate positions into a virtual map environment;
   representing a cluster of nodes with a representative node to form a hierarchy of nodes and clusters where changes in a status of the representative node implies a status change in the nodes of the cluster; and
   selectively monitoring the representative nodes for the changes in status such that the representative nodes create a capability for scalable monitoring of the network.

13. A method for scalable status change detection in a network of nodes, comprising the steps of:
  determining reference positions in a virtual map environment;
  determining node coordinate positions based on the reference positions in the virtual map environment;
  clustering nodes based on the positions in the virtual map environment;
    representing a cluster of nodes with a leader node where changes in a status of the leader node implies a status change in the nodes of the cluster; and
    monitoring the leader node for status changes.

14. The method as recited in claim 13, wherein the step of representing a cluster of nodes includes creating a hierarchy of node clusters and subclusters.

15. The method as recited in claim 14, wherein the step of monitoring includes monitoring leader nodes at a plurality of different cluster levels to provide scalable monitoring of a network.

16. The method as recited in claim 13, further comprising the step of updating virtual coordinates in the virtual coordinate map to determine a change in status of nodes in the network.

17. The method as recited in claim 16, further comprising the step of investigating where changes have occurred by subdividing clusters.

18. The method as recited in claim 17, further comprising the step of determining a centroid for the subdivided cluster and further subdividing the cluster if a status of the cluster has changed.

19. The method as recited in claim 13, wherein the step of monitoring includes determining identified nodes which have changed status.

20. The method as recited in claim 19, wherein the step of determining nodes which have changed status includes, if a monitored property for a segment has changed, listing affected nodes.

21. The method as recited in claim 20, further comprising the step of comparing the affected nodes with the nodes that have changed status to determine candidates responsible for the status change.

22. The method as recited in claim 13, wherein the changes in the status being monitored include delay changes, distance changes, security, packet loss rate and/or activity changes.

23. The method as recited in claim 13, wherein the step of determining node coordinate positions includes computing distances in the virtual map environment.

24. A computer program product comprising a computer readable storage medium including a computer readable program, wherein the computer readable program when executed on a computer causes the computer to perform the steps as recited in claim 13.

25. A system for monitoring status changes in a network, comprising:
  a server being coupled to a network and interacting with the network to collect virtual coordinate information from the network;
  a virtual map stored in memory associated with the server, the virtual map including virtual coordinates for nodes and representative nodes, which represent groups of nodes in the network; and
  a monitoring module which periodically updates the virtual coordinates in the map to detect status changes in or between the nodes or groups of nodes, the virtual coordinates representing monitored properties of the network.

26. The system as recited in claim 25, further comprising a threshold differences wherein the monitoring module compares new virtual coordinates to old virtual coordinates to determine if a change is status has occurred.

27. The system as recited in claim 25, wherein the monitoring module monitors leader nodes at a plurality of different cluster levels to provide scalable monitoring of a network.

28. The system as recited in claim 25, wherein the monitoring module subdivides clusters of nodes to investigate changes in status.

29. The system as recited in claim 25, wherein the monitoring module determines a representative node for subdivided clusters and further monitors the representative for the subdivided cluster to investigate a status of the subdivided cluster.

30. The system as recited in claim 25, wherein the changes in the status being monitored include delay changes, distance changes, and/or traffic changes.

31. A method for scalable status change detection in a network of nodes, comprising the steps of:
  embedding node coordinate positions into a virtual map environment;
  representing a cluster of nodes with a representative virtual map to form a hierarchy of virtual maps representing clusters and subclusters of nodes such that changes in a status of the representative virtual map implies a status change in the nodes of the cluster or subcluster; and
  selectively monitoring the representative virtual maps for the changes in status such that the representative virtual maps create a capability for scalable monitoring of the network.

* * * * *